United States Patent [19]

Schnettler et al.

[11] 3,888,860

[45] June 10, 1975

[54] 3-[2-(4-THIENOYLPIPERAZIN-1-YL)ETHYL]INDOLES

[75] Inventors: Richard A. Schnettler, Brown Deer; John T. Suh, Mequon, both of Wis.

[73] Assignee: Colgate-Palmolive Company, New York, N.Y.

[22] Filed: Jan. 7, 1974

[21] Appl. No.: 431,094

[52] U.S. Cl. ........ 260/268 BC; 260/268 C; 424/250
[51] Int. Cl. ............................................. C07d 51/70
[58] Field of Search ............................. 260/268 BC

[56] References Cited
UNITED STATES PATENTS

| | | | |
|---|---|---|---|
| 3,135,794 | 6/1964 | Archer | 260/268 BC |
| 3,146,234 | 8/1964 | Archer | 260/268 BC |
| 3,501,465 | 3/1970 | Shen et al. | 260/268 BC |
| 3,562,278 | 2/1971 | Archer | 260/268 BC |
| 3,751,416 | 8/1973 | Allen et al. | 260/268 BC |
| 3,751,417 | 8/1973 | Allen et al. | 260/268 BC |
| 3,810,897 | 5/1974 | Phillippe | 260/268 BC |

OTHER PUBLICATIONS

Istituto Luso Farmaco d'Italia S.R.I. Chemical Abstracts Vol. 68, 69041k (1968).

Laskowski, Stanley C., Chemical Abstracts Vol. 72, 43,733V, (1970).

*Primary Examiner*—Donald G. Daus
*Assistant Examiner*—Jose Tovar
*Attorney, Agent, or Firm*—T. F. Kryshak; M. L. Youngs

[57] ABSTRACT

The compounds are 3-[2-(4-thienoylpiperazin-1-yl)ethyl]-indoles which are central nervous system depressants, antihypertensive agents and analgetic agents. The compound 3-[2-(4-thienoylpiperazin-1-yl)ethyl]indole is disclosed.

3 Claims, No Drawings

3-[2-(4-THIENOYLPIPERAZIN-1-YL)ETHYL]INDOLES

DESCRIPTION OF THE INVENTION

The compounds of the present invention may be represented by the following formula:

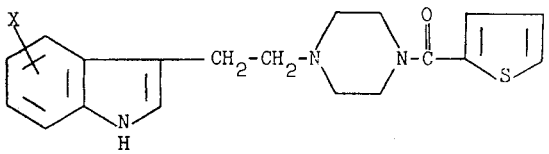

in which X is hydrogen, a halogen such as chloro, bromo or fluoro, trifluoromethyl, hydroxy and alkoxy of one to four carbon atoms such as methoxy, ethoxy or propoxy.

In the preferred method of preparation, a 3-indole-lower-alkyl halide is dissolved in a suitable solvent such as benzene, and the thienoylpiperazine added. The resulting mixture is then heated at reflux to form the desired distubstituted piperazine. The compound thus obtained may be purified by recyrstallization from a suitable solvent.

The preferred practice may be illustrated as follows:

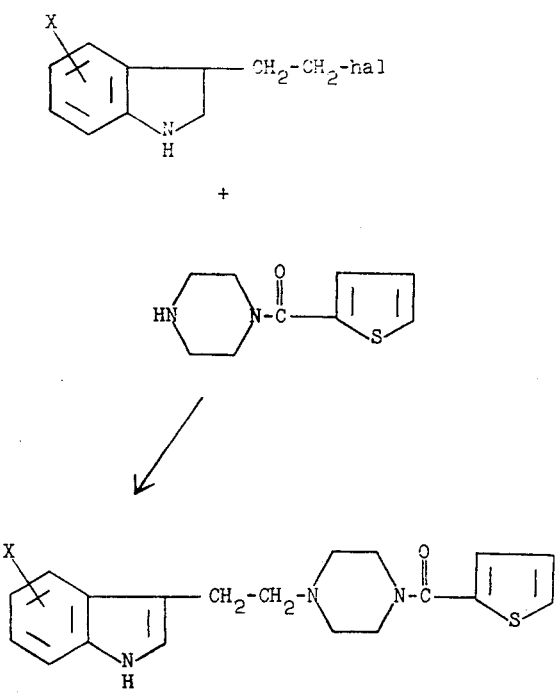

in which hal is a reactive halogen and X is as previously defined.

The basic starting materials for the preparation of the compounds of the invention are 3-indolyl-lower-alkyl halides of the formula:

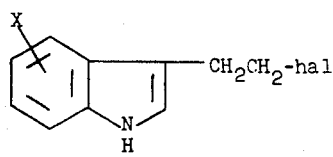

in which X is as previously described. These compounds are known or can be prepared by known methods. Representative of these compounds are the following:

3-(2-Bromoethyl)indole,
5-Methoxy-3-(2-bromoethyl)indole,
6-Chloro-3-(2-bromoethyl)indole, and
7-Hydroxy-3-(2-bromoethyl)indole.

Representative of the final compounds which may be prepared by the described process are the following:

3-[2-(4-Thienoylpiperazin-1-yl)ethyl]indole,
5-Methoxy-3-[2-(4-thienoylpiperazin-1-yl)ethyl]indole,
6-Chloro-3-[2-(4-thienoylpiperazin-1-yl)ethyl]indole, and
7-Hydroxy-3-[2-(4-thienoylpiperazin-1-yl)ethyl]indole.

The compounds of the present invention, as well as their acid addition salts, possess pharmaceutical utility as central nervous system depressants, antihypertensive agents and analgetic agents.

In behavioral screening tests in mice, the compound 3-[2-(4-thienoylpiperazin-1-yl)ethyl]indole produced marked central nervous system depression. The behavior of animals receiving 100–300 mg/kg of the compound intraperitoneally in the form of a 5% acacia suspension was characterized by decreased awareness and mood depression. As a result of the behavioral tests, the compound was found to have an oral $LD_{50}$ of about 1,000 mg/kg. The behavioral tests were conducted in accordance with the procedure set forth by Irwin in "Animal and Clinical Pharmacologic Techniques in Drug Evaluation," J. H. Nodine, and P. E. Siegler, Ed., Year Book Publishers, Inc., 1964, pp. 36–54.

The compound was also found to lower blood pressure significantly when administered in 1, 3 and 10 mg/kg intravenous doses to vagotomized, anesthetized cat and dog preparations which are the standard preparations for testing antihypertensive activity. In addition, the compound demonstrated analgetic properties when evaluated by the conventional "hot plate" technique.

The acid addition salts of the compounds may be prepared by treating the free base in a suitable solvent with an organic or inorganic acid. Representative of such acids are hydrochloric, phosphoric, nitric, sulfuric, maleic, citric, ascorbic, methane-sulfonic and succinic acid.

The compounds are normally employed in the form of their non-toxic, pharmaceutical acid addition salts, which may be combined with pharmaceutical diluents such as flavoring agents and the like to form conventional unit dosage forms such as capsules, tablets or parenteral solutions. Generally such dosage forms will contain 20–200 mg. of the active ingredient. The total dose of the compound to be administered daily will normally not exceed 50 mg/kg of body weight.

The following examples further illustrate the practice of the present invention:

EXAMPLE 1

3-[2-(4-Thienoylpiperazin-1-yl)ethyl]indole

A slurry of 3.0 g. (0.011 mole)) of 3-(2-bromoethyl)indole and 4.3 g. (0.022 mole) of N-2-thienoylpiperazine in 100 ml. of benzene is refluxed for 18 hours and cooled. The solids are filtered, the solvent distilled and the residual oil chromatographed over silica gel (chloroform/isopropyl alcohol, 9.8:0.2) to afford 4.2 g.

of an off-white solid ($R_f = 0.55$) which is recrystallized from benzene/cyclohexane to afford 3-[2-(4-thienoylpiperazin-1-yl)ethyl]indole, m.p. 153°–154.5°.

Anal. Calc'd. for $C_{19}H_{20}N_3OS$: C, 67.41; H, 5.96; N, 12.42.

Found: C, 67.45; H, 6.16; N, 12.36.

EXAMPLE 2

5-Methoxy-3-[2-(4-thienoylpiperazin-1-yl)ethyl]indole

The procedure of Example 1 is repeated using 5-methoxy-3-(2-bromoethyl)indole to obtain 5-methoxy-3[2-(4-thienoylpiperazin-1-yl)ethyl]indole.

We claim:

1. A compound selected from a compound of the formula

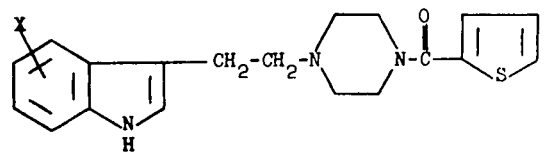

in which X is hydrogen, halogen, hydroxy and methoxy, and pharmaceutically acceptable acid addition salts thereof.

2. A compound of claim 1 in which X is halogen.

3. The compound of claim 1 which is 3-[2-(4-thienoylpiperazin-1-yl)ethyl]indole.

* * * * *